US011849179B2

United States Patent
Weber et al.

(10) Patent No.: US 11,849,179 B2
(45) Date of Patent: Dec. 19, 2023

(54) CHARACTERIZING AUDIENCE ENGAGEMENT BASED ON EMOTIONAL ALIGNMENT WITH CHARACTERS

(71) Applicant: DISNEY ENTERPRISES, INC., Burbank, CA (US)

(72) Inventors: Romann Matthew Weber, Uster (CH); Graziana Mignone, Schlieren (CH); Jacek Krzysztof Naruniec, Windlach (CH); Aaron Michael Baker, Apex, NC (US); Farnood Salehi, Zurich (CH); Dennis Li, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/701,243

(22) Filed: Mar. 22, 2022

(65) Prior Publication Data
US 2023/0199250 A1    Jun. 22, 2023

Related U.S. Application Data

(60) Provisional application No. 63/292,155, filed on Dec. 21, 2021.

(51) Int. Cl.
*H04N 21/442* (2011.01)
*H04N 21/466* (2011.01)

(52) U.S. Cl.
CPC ... *H04N 21/44218* (2013.01); *H04N 21/4662* (2013.01)

(58) Field of Classification Search
None
See application file for complete search history.

(56) References Cited

U.S. PATENT DOCUMENTS

| | | | |
|---|---|---|---|
| 9,678,960 B2 | 6/2017 | Robert et al. | |
| 10,104,429 B2 | 10/2018 | Robert et al. | |
| 10,880,601 B1 * | 12/2020 | Donahoe | G06V 40/174 |
| 2009/0090020 A1 * | 4/2009 | Choi | D06F 58/46 34/88 |
| 2009/0226046 A1 * | 9/2009 | Shteyn | H04N 21/6582 707/999.1 |

(Continued)

OTHER PUBLICATIONS

Vonnegut, Kurt, "Palm Sunday: An Autobiographical Collage", Dial Press, 1999, 261 pages.

(Continued)

*Primary Examiner* — Alexander Q Huerta
(74) *Attorney, Agent, or Firm* — Artegis Law Group, LLP

(57) ABSTRACT

Techniques are disclosed for characterizing audience engagement with one or more characters in a media content item. In some embodiments, an audience engagement characterization application processes sensor data; such as video data capturing the faces of one or more audience members consuming a media content item, to generate an audience emotion signal. The characterization application also processes the media content item to generate a character emotion signal associated with one or more characters in the media content item. Then, the characterization application determines an audience engagement score based on an amount of alignment and/or misalignment between the audience emotion signal and the character emotion signal.

20 Claims, 11 Drawing Sheets

(56) References Cited

U.S. PATENT DOCUMENTS

| | | | | | |
|---|---|---|---|---|---|
| 2013/0283162 | A1* | 10/2013 | Aronsson | ............. | G11B 27/105 715/719 |
| 2016/0057499 | A1* | 2/2016 | Foerster | ............. | H04N 21/4782 705/319 |
| 2016/0330529 | A1* | 11/2016 | Byers | ................. | G06Q 30/0207 |
| 2017/0134803 | A1* | 5/2017 | Shaw | ............. | H04N 21/234363 |
| 2019/0073811 | A1 | 3/2019 | Shah et al. | | |
| 2019/0090020 | A1* | 3/2019 | Srivastava | ............. | G11B 27/28 |
| 2019/0132647 | A1* | 5/2019 | Shah | ................. | H04N 21/4532 |
| 2020/0168250 | A1* | 5/2020 | Vijil | ................... | H04N 21/8456 |
| 2020/0296480 | A1* | 9/2020 | Chappell, III | ..... | H04N 21/8545 |
| 2021/0150215 | A1 | 5/2021 | Zhang et al. | | |
| 2022/0132179 | A1* | 4/2022 | Bennett-James | ...... | G06V 20/70 |

OTHER PUBLICATIONS

Reagan et al., "The Emotional Arcs of Stories Are Dominated by Six Basic Shapes", EPJ Data Science, vol. 5, No. 31, 2016, pp. 1-12.

Busselle et al., "Measuring Narrative Engagement", Media Psychology, DOI: 10.1080/15213260903287259, vol. 12, No. 4, 2009, pp. 321-347.

Green et al., "Understanding Media Enjoyment: The Role of Transportation Into Narrative Worlds", Communication theory, vol. 14, No. 4, Nov. 2004, pp. 311-327.

Cohen, Jonathan, "Defining Identification: A Theoretical Look at the Identification of Audiences with Media Characters", Mass Communication & Society, vol. 4, No. 3, 2001, pp. 245-264.

Toisoul et al., "Estimation of Continuous Valence and Arousal Levels from Faces in Naturalistic Conditions", Nature Machine Intelligence, vol. 3, Jan. 2021, pp. 42-50.

Konar et al., "Emotion Recognition: A Pattern Analysis Approach", John Wiley & Sons, 2015, 583 pages.

Ferretti et al., "Understanding Others: Emotion Recognition in Humans and Other Animals", Genes, Brain and Behavior, DOI: 10.1111/gbb.12544, vol. 18, No. 1, 2019, 12 pages.

Abbruzzese et al., "Age and Gender Differences in Emotion Recognition", Frontiers in Psychology, doi:10.3389/fpsyg.2019.02371, vol. 10, 2019, 30 pages.

Ekman et al., "Universal Facial Expressions of Emotion: An Old Controversy and New Findings", 1997, pp. 27-46.

Martinez et al., "Automatic Analysis of Facial Actions: A Survey", IEEE Transactions on Affective Computing, 2017, 23 pages.

Li et al., "Deep Facial Expression Recognition: A Survey", IEEE Transactions on Affective Computing, 2020, 25 pages.

Baltrušaitis et al., OpenFace 2.0: Facial Behavior Analysis Toolkit, In 13th IEEE International Conference on Automatic Face & Gesture Recognition (FG 2018), 2018, pp. 59-66.

Russell, James A., "A Circumplex Model of Affect", Journal of Personality and Social Psychology, vol. 39, No. 6, 1980, pp. 1161-1178.

Verma et al., "Affect representation and recognition in 3D continuous valence-arousal-dominance space", Multimedia Tools and Applications, DOI 10.1007/s11042-015-3119-y, vol. 76, 2015, pp. 2159-2183.

Mollahosseini et al., AffectNet: A Database for Facial Expression, Valence, and Arousal Computing in the Wild, IEEE Transactions on Affective Computing, vol. 10, No. 1, 2017, 18 pages.

Kossaifi et al., "AFEW-VA Database for Valence and Arousal Estimation In-The-Wild", Image and Vision Computing, vol. 65, 2017, pp. 23-36.

Schuller et al., "AVEC 2012: The Continuous Audio/Visual Emotion Challenge", In Proceedings of the 14th ACM International conference on Multimodal interaction, 2012, pp. 449-456.

Smith, Adam, "The Theory of Moral Sentiments", Penguin, 2010, 185 pages.

Chartrand et al., "The Chameleon Effect: The Perception-Behavior Link and Social Interaction", Journal of Personality and Social Psychology, vol. 76, No. 6, 1999, pp. 893-910.

Lakin et al., "The Chameleon Effect as Social Glue: Evidence for the Evolutionary Significance of Nonconscious Mimicry", Journal of Nonverbal Behavior, vol. 27, No. 3, 2003, pp. 145-162.

Hatfield et al., "Emotional Contagion", Current Directions in Psychological Science, vol. 2, No. 3, Jun. 1993, pp. 96-100.

Hatfield et al., "New Perspectives on Emotional Contagion: A Review of Classic and Recent Research on Facial Mimicry and Contagion", Interpersona, vol. 8, No. 2, 2014, pp. 159-179.

Delaherche et al., "Interpersonal Synchrony: A Survey of Evaluation Methods Across Disciplines", Affective Computing, IEEE Transactions on, vol. 3, No. 3, 2012, pp. 349-365.

Hasson et al., "Mirroring and Beyond: Coupled Dynamics as a Generalized Framework for Modelling Social Interactions", Philosophical Transactions of the Royal Society B: Biological Sciences, vol. 371, 2016, 9 pages.

Murch, Walter, "In the Blink of an Eye", IInd Edition, vol. 995, Silman-James Press, Los Angeles, 2001, 81 pages.

Coplan, Amy, "Catching Characters Emotions: Emotional Contagion Responses to Narrative Fiction Film", Film Studies, vol. 8, No. 1, 2006, pp. 26-38.

Senin, Pavel V., "Literature Review on Time Series Indexing", Collaborative Software Development Lab, Department of Information and Computer Sciences, Apr. 2009, 36 pages.

Perng et al., "Landmarks: A New Model for Similarity-Based Pattern Querying in Time Series Databases", In Proceedings of 16th International Conference on Data Engineering, 2000, pp. 33-42.

Kahneman, Daniel, "Evaluation by Moments: Past and Future", Choices, Values, and Frames, 2000, pp. 693-708.

Seth, Anil, "Granger Causality", Scholarpedia, vol. 2, No. 7, doi:10-4249/scholarpedia. 1667, 2007, 9 pages.

Friesen et al., "Facial Action Coding System, A Technique for The Measurement of Facial Movement", vol. 3, No. 2, 1978, 1 page.

Extended European Search Report for Application No. 22215602.8 dated Mar. 3, 2023.

Damiano et al., "Studying and Designing Emotions in Live Interactions with the Audience", Multimedia Tools and Applications, DOI:10.1007/S11042-020-10007-3, vol. 80, No. 5, Oct. 20, 2020, pp. 6711-6736.

* cited by examiner

CHARACTERIZING AUDIENCE ENGAGEMENT BASED ON EMOTIONAL ALIGNMENT WITH CHARACTERS

CROSS-REFERENCE TO RELATED APPLICATIONS

This application claims priority benefit of the United States Provisional Patent Application titled, "CHARACTERIZING AUDIENCE ENGAGEMENT BASED ON EMOTIONAL ALIGNMENT WITH ONSCREEN CHARACTERS," filed on Dec. 21, 2021, and having Ser. No. 63/292,155. The subject matter of this related application is hereby incorporated herein by reference.

BACKGROUND

Technical Field

Embodiments of the present disclosure relate generally to computer science and machine learning and, more specifically, to techniques for characterizing audience engagement based on emotional alignment with characters.

Description of the Related Art

Producing media content items, such as movies and episodic shows, is oftentimes risky and expensive. Predictions of audience reactions to media content items can inform decisions on whether to produce those media content items.

One conventional approach for predicting audience reactions involves showing a media content item to a sample audience that provides feedback on the media content item. For example, a production company might show a pilot episode that is representative of an episodic show to a focus group of volunteers and elicit, from each volunteer, feedback on his or her evaluation of the pilot episode and intent to watch the episodic show. Typically, each volunteer provides feedback via a standardized survey. In some cases, dial testing is also employed. During dial testing, each volunteer turns a knob on a handheld device to provide a real-time signal of his or her opinions towards a media content item.

One drawback of the above approaches to predicting audience reactions to a media content item is that these approaches can be susceptible to self-reporting bias. In that regard, volunteers who consume a media content item are required to use their judgment to provide feedback on surveys or during dial testing, which can lead to self-reporting bias. Dial testing can also be distracting to a volunteer who is trying to consume a media content item. Accordingly, survey and dial testing data is oftentimes unreliable and, as a result, cannot be used to make reliable predictions of audience reactions to media content items. In addition, few, if any, techniques exist to systematically process survey or dial testing data in a manner that generates accurate predictions of audience reactions to media content items. For example, only about 40 percent of episodic shows that are vetted using conventional approaches and produced for one season are popular enough to be produced for a second season. In some cases, an episodic show is canceled after only a few episodes are produced.

As the foregoing illustrates, what is needed in the art are more effective techniques for predicting audience reactions to media content items.

SUMMARY

One embodiment of the present application sets forth a computer-implemented method for characterizing engagement with at least one character in a media content item. The method includes processing sensor data associated with at least one individual to generate a first signal that indicates one or more emotions expressed by the at least one individual while consuming the media content item or a live event recorded in the media content item. The method further includes processing the media content item to generate a second signal that indicates one or more emotions expressed by the at least one character in the media content item. In addition, the method includes computing a score based on the first signal and the second signal. The score indicates at least one of an amount of alignment or an amount of misalignment between the first signal and the second signal.

Other embodiments of the present disclosure include, without limitation, one or more computer-readable media including instructions for performing one or more aspects of the disclosed techniques as well as a computing device for performing one or more aspects of the disclosed techniques.

At least one technical advantage of the disclosed techniques relative to the prior art is that the disclosed techniques generate an audience engagement score based on involuntary emotional reactions of audience members to characters in a media content item, which is not susceptible to self-reporting bias and, therefore, more reliable than conventional survey and dial testing data. Accordingly, the disclosed techniques can be used to systematically predict audience engagement with a media content item. The predicted audience engagement can then be used to decide whether to produce the media content item or a collection thereof, to schedule a time for airing the media content item; to identify particular characters within the media content item that audiences engage with, and/or to modify the media content item, among other things. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention, However, it will be apparent to one of skill in the art that embodiments of the present invention may be practiced without one or more of these specific details.

System Overview

Figure 1:
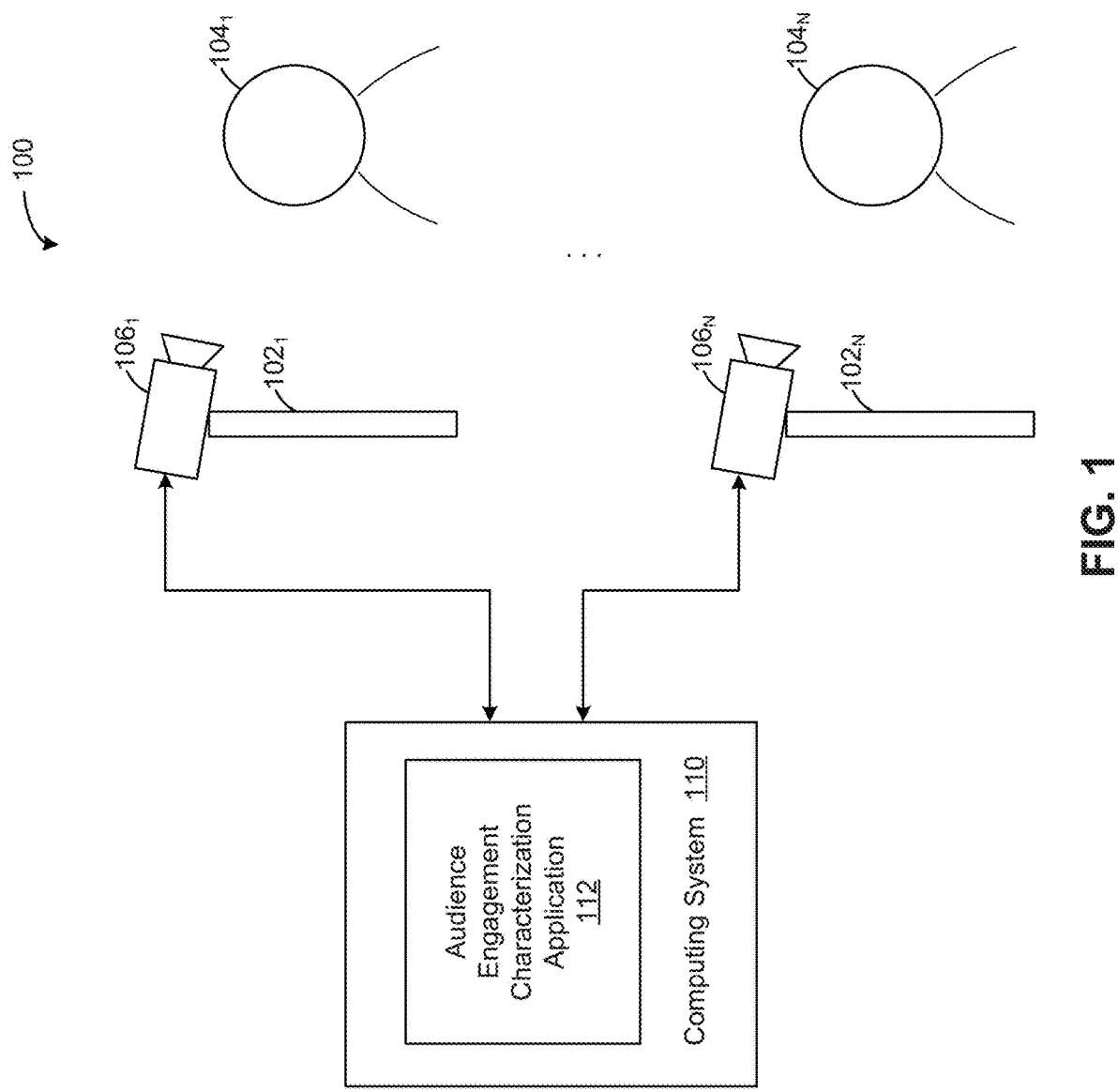
FIG. 1 illustrates a system for determining an emotional alignment between audience members consuming a media content item and one or more characters in the media content item, according to various embodiments.

FIG. 1 illustrates a system 100 for determining an emotional alignment between audience members consuming a media content item and one or more characters in the media content item, according to various embodiments. As shown, the system 100 includes output devices $102_{1-N}$ (referred to herein collectively as output devices 102 and individually as an output device 102) that output one or more media content items to audience members $104_{1-N}$ (referred to herein collectively as audience members 104 and individually as an audience member 104), respectively. Examples of media content items include movies, episodes of episodic shows, short films, advertisements, recordings of events, clips, streaming videos, books, audio recordings, songs, or portions thereof. In addition, the system 100 includes sensor devices $106_{1-N}$ (referred to herein collectively as sensor devices 106 and individually as a sensor device 106) that acquire sensor data associated with corresponding audience members 104 as those audience members 104 are consuming the media content item. Although described herein primarily with respect to audience members consuming a media content item, in some embodiments, the audience members can consume a live event that is recorded in a media content item. In such cases, sensor devices can acquire sensor data associated with the audience members consuming the live event, and a recording (e.g., a video or transient recording) can also be made of the live event for at least a time window of interest.

In some embodiments, any technically feasible output devices 102 can be used to output media content item(s), and any technically feasible sensor devices 106 can be used to acquire any suitable sensor data. Further, any number of output devices 102 and sensor devices 106 can be employed in some embodiments. For example, in some embodiments, computer monitors, mobile device displays, television displays, and/or speakers can be used to output a media content item, and cameras (integrated therein or in communication therewith) can capture videos of audience members consuming the media content item. As another example, in some embodiments, multiple audience members can consume a media content item that is output via a projection screen and/or speakers, and a camera can be used as a sensor device to capture a video of a plurality of audience members consuming the media content item. As further examples, in addition to or in lieu of cameras that capture visible light, infrared cameras, microphones, etc. can be used to acquire sensor data.

Illustratively, sensor data that is acquired by the sensor devices 106 is transmitted to a computing system 110 for processing. In some embodiments, the sensor data can be transmitted either directly or indirectly, and in any technically feasible manner. For example, in the case of a streaming media content item, the sensor data could be transmitted over the Internet from personal computing devices belonging to the audience members 104 to the computing system 110. As another example, the computing system 110 could be connected to sensor devices 106 that transmit sensor data directly to the computing system 110.

As shown, an audience engagement characterization application 112 (also referred to herein as "characterization application 112") executes in the computing system 110. The characterization application 112 analyzes sensor data from the sensor devices 106 in conjunction with the media content item, itself, to generate an audience engagement score. In some embodiments, the characterization application 112 generates the audience engagement score based on an amount of emotional alignment between the audience members 104 consuming the media content item and one or more characters in the media content item. The computing system 110, in which the characterization application 112 executes, is discussed in greater detail below in conjunction with FIG. 2. The characterization application 112 is discussed in greater detail below in conjunction with FIGS. 3-11.

Figure 2:
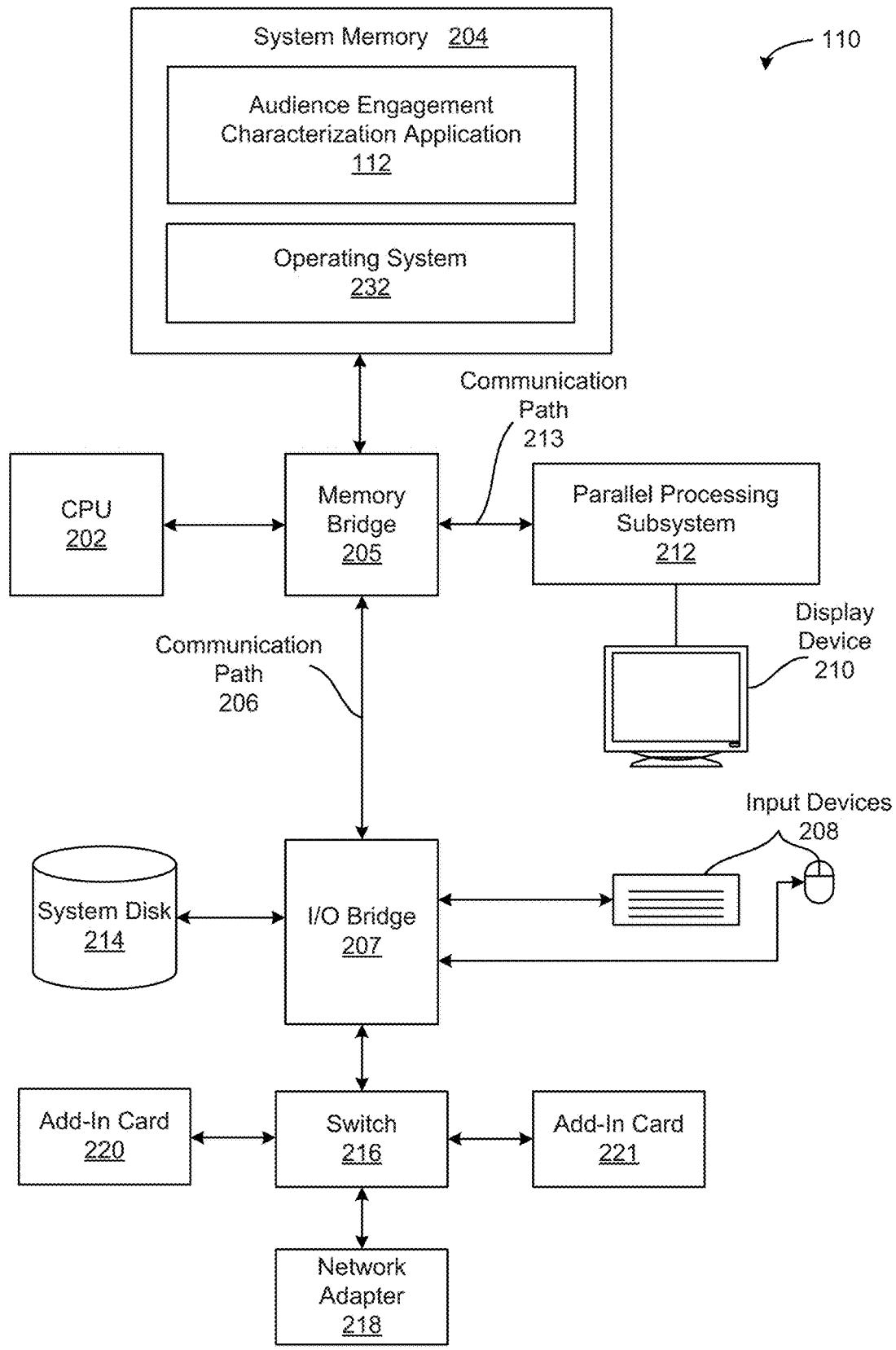
FIG. 2 is a block diagram of a computer system that may be implemented in conjunction with the system of FIG. 1, according to various embodiments.

FIG. 2 is a block diagram of the computing system 110 that may be implemented in conjunction with the system of FIG. 1, according to various embodiments. As shown, the computing system 110 includes, without limitation, a central processing unit (CPU) 202 and a system memory 204 coupled to a parallel processing subsystem 212 via a memory bridge 205 and a communication path 213. The memory bridge 205 is further coupled to an I/O (input/output) bridge 207 via a communication path 206, and the I/O bridge 207 is, in turn, coupled to a switch 216.

In operation, the I/O bridge 207 is configured to receive user input information from one or more input devices 208, such as a keyboard, a mouse, a joystick, etc., and forward the input information to the CPU 202 for processing via the communication path 206 and the memory bridge 205. The switch 216 is configured to provide connections between the I/O bridge 207 and other components of the computing system 110, such as a network adapter 218 and various add-in cards 220 and 221. Although two add-in cards 220 and 221 are illustrated, in some embodiments, the computing system 110 may only include a single add-in card.

As also shown, the I/O bridge 207 is coupled to a system disk 214 that may be configured to store content, applications, and data for use by CPU 202 and parallel processing subsystem 212. As a general matter, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, movie recording devices, and the like, may be connected to the I/O bridge 207 as well.

In various embodiments, the memory bridge 205 may be a Northbridge chip, and the I/O bridge 207 may be a Southbridge chip. In addition, communication paths 206 and 213, as well as other communication paths within the computing system 110, may be implemented using any technically suitable protocols, including, without limitation, AGP (Accelerated Graphics Port), HyperTransport, or any other bus or point-to-point communication protocol known in the art.

In some embodiments, the parallel processing subsystem 212 comprises a graphics subsystem that delivers pixels to a display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. Such circuitry may be incorporated across one or more parallel processing units (PPUs) included within the parallel processing subsystem 212. In other embodiments, the parallel processing subsystem 212 incorporates circuitry optimized for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and compute processing operations. The system memory 204 may include at least one device driver configured to manage the processing operations of the one or more PPUs within the parallel processing subsystem 212.

In various embodiments, the parallel processing subsystem 212 may be or include a graphics processing unit (GPU). In some embodiments, the parallel processing subsystem 212 may be integrated with one or more of the other elements of FIG. 2 to form a single system. For example, the parallel processing subsystem 212 may be integrated with the CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 204 could be connected to the CPU 202 directly rather than through the memory bridge 205, and other devices would communicate with the system memory 204 via the memory bridge 205 and the CPU 202. In other alternative topologies, the parallel processing subsystem 212 may be connected to the I/O bridge 207 or directly to the CPU 202, rather than to the memory bridge 205. In still other embodiments, the I/O bridge 207 and the memory bridge 205 may be integrated into a single chip instead of existing as one or more discrete devices. In some embodiments, any combination of the CPU 202, the parallel processing subsystem 212, and the system memory 204 may be replaced with any type of virtual computing system, distributed computing system, or cloud computing environment, such as a public cloud, a private cloud, or a hybrid cloud. Lastly, in certain embodiments, one or more components shown in FIG. 2 may not be present. For example, the switch 216 could be eliminated, and the network adapter 218 and add-in cards 220, 221 would connect directly to the I/O bridge 207.

Illustratively, the system memory 204 stores the characterization application 112 and an operating system 232 on which the characterization application 112 runs. The operating system 232 may be, e.g., Linux®, Microsoft Windows®, or macOS®. In some embodiments, the characterization application 112 determines an audience engagement score based on an amount of alignment and/or misalignment between an audience emotion signal, which is generated based on sensor data, and a character emotion signal, which is generated based on a media content item, as discussed in greater detail below in conjunction with FIGS. 3-11.

Characterizing Audience Engagement Based on Emotional Alignment with Characters

Figure 3:
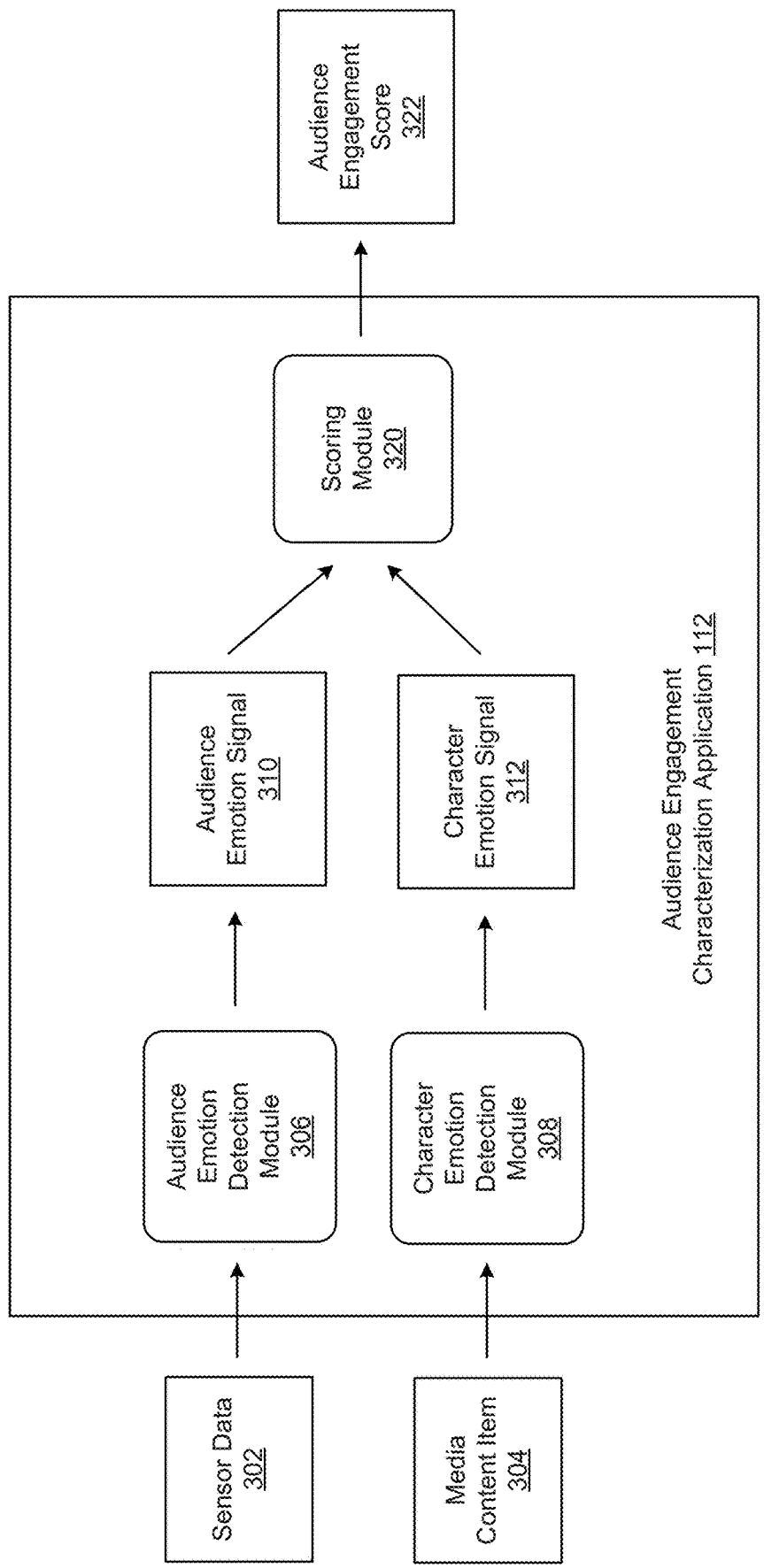
FIG. 3 illustrates in greater detail the characterization application of FIGS. 1-2, according to various embodiments.

FIG. 3 illustrates in greater detail the characterization application 112 of FIGS. 1-2, according to various embodiments. As shown, the characterization application 112 includes an audience emotion detection module 306, a character emotion detection module 308, and a scoring module 320. The audience emotion detection module 306 takes as input sensor data 302 and generates an audience emotion signal 310. In some embodiments, the sensor data 302 can include video data that captures the facial expressions of one or more audience members consuming a media content item 304 (or live event that is recorded in the media content item 304). The audience members can include a sample of members of the general population or members of a specific population, such as volunteers of a particular demographic (e.g., sex, gender, age range, geographic location, etc.). In some embodiments, the audience emotion signal 310 is generated as an average over multiple audience members. In some embodiments, the audience emotion signal 310 is generated for an individual audience member.

In some embodiments, the audience emotion detection module 306 inputs the sensor data 302 into a machine learning model that generates the audience emotion signal 310. Any technically feasible machine learning model can be used in some embodiments. For example, in some embodiments, the machine learning model can be a facial emotion recognition (FER) model that outputs the emotional valence of audience member(s) in the sensor data 302. Valence is a measure of emotion that increases when a positive emotion (e.g., happiness, joy, pleasant surprise, etc.) is expressed and decreases when a negative emotion (e.g., anger, sadness, disgust, etc.) is expressed. In some embodiments, positive valence values are associated with positive emotions, and negative valence values are associated with negative emotions. Examples of FER models that take frames of a video as inputs and output valence values include the well-known Emonet-5 and Emonet-8 models. Although described herein with respect to valence as a reference example, in some embodiments, a FER or other machine learning model can be used to generate an audience emotion signal that indicates another measure of emotion, such as arousal, and/or that indicates discrete emotions such as happiness, anger, disgust, etc. Arousal is a measure of emotion that increases when an exciting emotion (e.g., rage) is expressed and decreases when a calming emotion (e.g., sadness) is expressed. In some embodiments, additional signal processing, such as averaging and/or smoothing (e.g., via a Gaussian moving-average filter), can be performed on the output of a machine learning model to generate the audience emotion signal 310.

The character emotion detection module 308 takes as input the media content item 304 and generates a character emotion signal 312, Any suitable media content item 304 can be analyzed to generate the emotion signal 312 in some embodiments. Although described herein primarily with respect to a single media content item 304, in some embodiments, multiple media content items can be analyzed to generate the character emotion signal 312. For example, multiple episodes of an episodic show, or multiple movies from a movie franchise, that an audience has consumed could be analyzed to generate the character emotion signal 312. In some embodiments, the character emotion signal 312 can be associated with multiple characters within the media content item 304 (or multiple media content items). For example, in some embodiments, the character emotion detection module 308 can determine the largest face within each frame of a video that includes at least one face, and use the largest face to generate the emotion signal 312. In some embodiments, the character emotion signal 312 can be associated with a single character within the media content item 304 (or multiple media content items). For example, in some embodiments, the character emotion detection module 308 can detect (e.g., via a facial recognition model or natural language processing) different characters within a media content item. Then, the character emotion detection module 308 can generate separate character emotion signals for each character based on frames of the media content item in which that character is detected. The separate character emotion signals can be used to determine audience engagement with individual characters in the media content item.

In some embodiments, the character emotion detection module 308 utilizes a machine learning model to generate the character emotion signal 312. For example, in some embodiments, the same machine learning model that is used to generate the audience emotion signal 310, described above, is applied to generate the character emotion signal 312. In some other embodiments, a different machine learning model can be applied to generate the character emotion signal 312 than is used to generate the audience emotion signal 310. For example, in some embodiments, the character emotion detection module 308 can analyze words that are spoken by one or more characters in a media content item using a natural language processing model to generate the character emotion signal 312. The words can be obtained from, e.g., a book that is the media content item, a script or dosed captioning data when the media content item is a video or audio recording, lyrics for a song that is the media content item, or any other suitable source. In some embodiments, additional signal processing, such as averaging and/ or smoothing (e.g., via a Gaussian moving-average filter), can be performed by the character emotion detection module 308 on the output of a machine learning model to generate the character emotion signal 312.

To determine audience engagement with one or more characters in the media content item 304, the scoring module 320 computes an audience engagement score 322 that indicates an amount of emotional alignment between audience member(s), whose emotions while consuming the media content item are represented by the audience emotion signal 310, and character(s) in the media content item 304, whose emotions are represented by the character emotion signal 312. In some embodiments, the audience engagement score 322 indicates mutual information between the audience emotion signal 310 and the character emotion signal 312, meaning that observing the character emotion signal 312 is predictive of the audience emotion signal 310, or vice versa. The audience engagement score 322 can be computed in any technically feasible manner based on the audience emotion signal 310 and the character emotion signal 312 in some embodiments. In some embodiments, the audience engagement score 322 can be computed as the negative logarithm of a Granger causality score, based on peaks in the audience emotion signal 310 and the character emotion signal 312, or based on a latent state model of alignment, as described in greater detail below in conjunction with FIGS. 3-11. In some embodiments, an audience engagement score can be computed based on any technically feasible measure of correlation, mutual information, and/or latent-state modeling between an audience emotion signal and a character emotion signal. When distinct audience emotion signals are generated for individual audience members, an audience engagement score can be computed for each audience member in some embodiments. Then, the audience engagement scores can be averaged together to generate an overall audience engagement score for multiple audience members. In some other embodiments, audience emotion signals for different audience members can be averaged first to generate an average audience emotion signal, and an alignment can be computed between the average audience emotion signal and the character emotion signal. Although described herein primarily with respect to computing the audience engagement score 322, in some embodiments, any number of audience engagement scores can be computed according to techniques disclosed herein. For example, in some embodiments, techniques disclosed herein can be applied locally to a set or sequence of scenes of a movie or episode of an episodic series (or another media content item), resulting in a set or sequence of audience engagement scores. As another example, in some embodiments, techniques disclosed herein can be applied locally to a sliding window of a predetermined size to generate a series of audience engagement scores whose length depends on the size of the window and the length of the media content item.

Once computed, the audience engagement score 322 can be used in any suitable manner, such as to modify a media content item, to determine whether to produce a media content item or collection thereof, to schedule airing of a media content item, to identify particular characters that audiences engage with, etc. In some embodiments, the audience engagement score 322 can be compared with the audience engagement scores of similar media content items that belong to the same genre. For example, the audience engagement scores for episodes of different comedy shows, which tend to be of similar lengths, can be compared with each other. In some embodiments, audience engagement scores can be computed for media content items having different time lengths by re-sampling the associated audience and character emotion signals to fit within a range from 0 to 100% of the total length of each media content item. Such a standardization permits audience engagement scores that are determined based on the re-sampled audience and character emotion signals to be compared with each other.

Figure 4A:
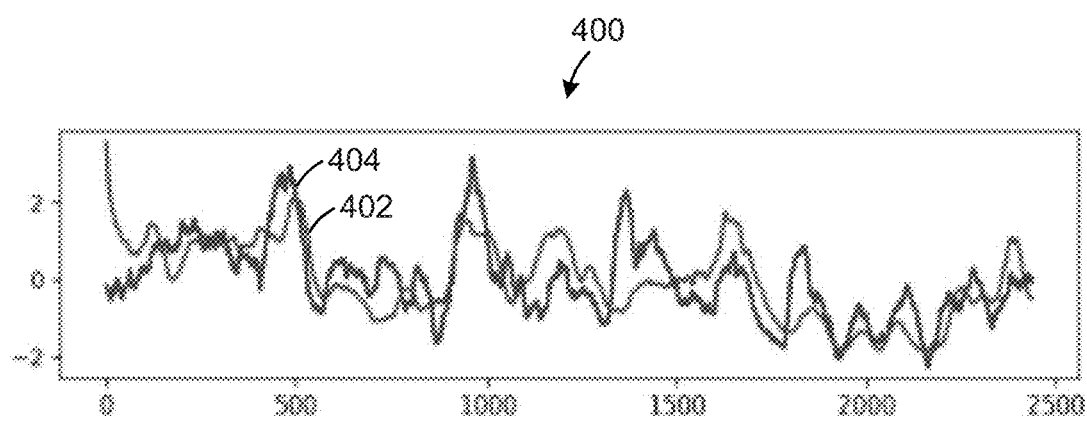
FIG. 4A illustrates exemplar time series representing the valence of audience members and of characters in an episode of a drama show, according to various embodiments.

FIG. 4A illustrates exemplar time series representing the valence of audience members and of characters in an episode of a drama show, according to various embodiments. As shown, a graph 400 includes a horizontal axis that represents time in seconds and a vertical axis that represents valence. In the example of FIG. 4A, valence values have been standardized to a zero mean and a unit variance. Illustratively, an average valence of audience members 402 (also referred to herein as "audience valence 402") consuming an episode of a drama show can be closely aligned with a valence of characters 404 (also referred to herein as "character valence 402") in the episode. When the audience valence 402 and the character valence 404 are aligned, values of the audience valence 402 and the character valence 404 are positively correlated and move together. Alignment can be caused by a passive form of mimicry by audience members of characters in a media content item. Mimicry is a psychological phenomenon in which human beings tend to imitate the expressions, mannerisms, speech patterns, and other behaviors of those around them. Mimicry is oftentimes spontaneous and unconscious. Mimicry can signal affection toward others and make it more likely for the mimicker to be liked by the mimicked. A related psychological phenomenon is emotional contagion, which refers to not only mimicry but also the resulting convergence of emotion states between the mimicker and the mimicked.

Figure 4B:
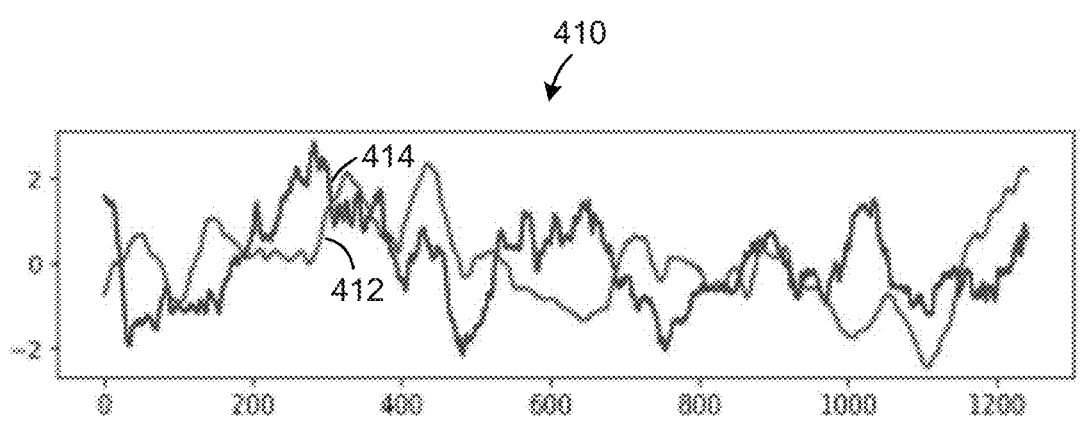
FIG. 4B illustrates exemplar time series representing the valence of audience members and of characters in an episode of a comedy show, according to various embodiments.

FIG. 4B illustrates exemplar time series representing the valence of audience members and of characters in an episode of a comedy show, according to various embodiments. Similar to the graph 400, a graph 410 includes a horizontal axis that represents time in seconds and a vertical axis that represents valence, which has been standardized to a zero mean and a unit variance. Illustratively, an average valence of audience members 412 (also referred to herein as "audience valence 412") who consume an episode of a comedy show can be aligned with a valence of characters 414 (also referred to as "character valence 414") in the episode at some times and misaligned at other times. When the audience valence 412 and the character valence 414 are misaligned, values of the audience valence 412 and the character valence 414 move together but are negatively correlated, Misalignments between the audience valence 412 and the character valence 414 can be caused by anti-mimicry behavior during certain moments of a media content item, such as when a villain is laughing but the audience is upset, when the audience laughs at an otherwise-liked character's misfortune in a comedy show, etc. It should be noted that misalignment is different from neutrality, in which values of the audience valence 412 and the character valence 414 do not move together and there is little to no mutual information. Neutrality can be caused by, e.g., audience inattention or disengagement with a media content item. Experience has shown that the aligned and misaligned states are positively correlated with audience assessments of a media content item in terms of intent to consume and evaluation of the media content, whereas the neutral state is negatively correlated with such audience assessments. In addition, experience has shown that some types of media content items, such as movies and episodic shows belonging to the drama genre, tend to be associated with tighter character-audience valence alignment than other types of media content items, such as movies and episodic shows belonging to the comedy genre.

As described, the characterization application 112 computes an audience engagement score (e.g., audience engagement score 322) that indicates an amount of emotional alignment between audience members consuming a media content item and one or more characters in the media content item. It should be noted that an audience valence signal can lag a character valence signal in some cases. However, the lag is not necessarily consistent, and the character valence signal can lag the audience valence signal in other cases (e.g., when the audience gets a joke before the character does). In some embodiments, the audience engagement score accounts for the inconsistent lag between the audience valence signal and the character valence signal. For example, in some embodiments, the audience engagement score can be computed as the negative logarithm of a Granger causality score, as a peak-based alignment score, or based on a latent state model of alignment. Computation of a peak-based alignment score, according to some embodiments, is discussed in greater detail below in conjunction with FIGS. 5A-5B. Computation of an audience engagement score based on a latent state model of alignment, according to some embodiments, is discussed in greater detail below in conjunction with FIGS. 6 and 7A-7B. The negative logarithm of a Granger causality score can be computed as follows in some embodiments.

Tests for Granger causality measure whether the values of one time series significantly improve the prediction of another time series, i.e., the causal explanatory power of one time series relative to another time series. A time series $X(t)$ is said to Granger cause a time series $Y(t)$ if lagged values of time series $X(t)$ help predict values of time series $Y(t)$ better than lagged values of time series $Y(t)$ alone. Granger causality can be tested using autoregressive moving average (ARMA) models of the form:

$$X(t) = \sum_{\tau=1}^{L}\left[\beta_{\tau}^{(X \to X)}X(t-\tau) + \beta_{\tau}^{(Y \to X)}Y(t-\tau)\right] + \in_X(t) \quad (1)$$

$$Y(t) = \sum_{\tau=1}^{L}\left[\beta_{\tau}^{(X \to Y)}X(t-\tau) + \beta_{\tau}^{(Y \to Y)}Y(t-\tau)\right] + \in_Y(t),$$

where each e is an independent noise term that can be assumed to be normally distributed. ARMA models are essentially linear regression models using L lagged values of the X and Y time series as predictors for a present value of the Y time series. The null hypothesis for tests of Granger causality is that the cross-series coefficients $\beta_{\tau}^{(Y \to X)}$ and $\beta_{\tau}^{(X \to Y)}$ in equation (1) are zero, corresponding to the absence of a Granger-causal link between the X and Y time series.

Various known tests for Granger causality can be employed in some embodiments. In some embodiments, the characterization application 112 computes a Granger causality score that indicates an amount of emotional alignment between an audience and a character by pooling the p-values of different statistical tests of Granger causality after selecting an optimized lag L via the Akaike Information Criterion (AIC). Each of the p-values represents a probability of observing the amount of emotional alignment under the null assumption that there is no relationship between the audience valence time series and the character valence time series, In addition, the negative logarithm of such a Granger causality score can be computed to indicate the average "surprisal" of observing the resulting test statistics under the null hypothesis:

$$S_{gr}(X, Y) = -\frac{1}{|\mathcal{T}|}\sum_{k \in \mathcal{T}} \log p_i, \quad (2)$$

where pi is the p-value of test i ∈ T. Intuitively, the higher the audience engagement score of equation (2), the more "surprising" an observation of the alignment between the audience valence and character valence time series would be absent a Granger-causal link, Further, the audience engagement score of equation (2) indicates whether there is a directional causality between the time series representing audience valence and the time representing character valence.

Figure 5A:
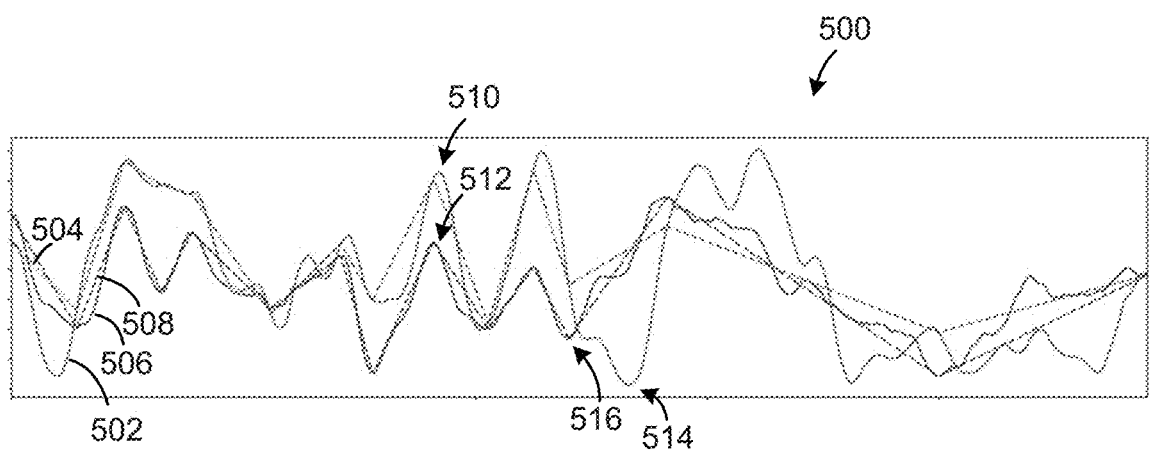
FIG. 5A illustrates an approach for computing a peak-based alignment score for exemplar time series representing the valence of audience members and of characters, according to various embodiments.
Figure 5B:
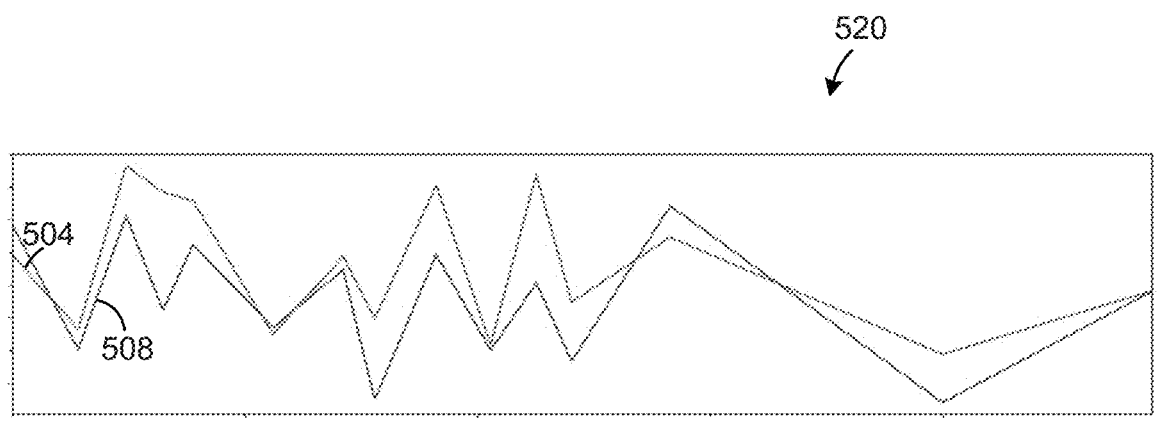
FIG. 5B illustrates exemplar piecewise linear functions that are generated by connecting peaks of the time series of FIG. 5A with linear functions, according to various embodiments.

FIGS. 5A-5B illustrate an approach for computing a peak-based alignment score, according to various embodiments. FIG. 5A shows a graph 500 that includes a horizontal axis representing time in seconds and a vertical axis representing valence, which has been standardized to a zero mean and a unit variance. As shown, a time series 502 representing the average valence of audience members consuming an episode of an episodic show can have a number of positive peaks (e.g., peak 510) and negative peaks (e.g., peak 514). At the positive and negative peaks, the valence value reaches a local maximum or minimum, respectively. Similarly, a time series 506 representing the valence of characters in the episode can include a number of positive peaks (e.g., peak 512) and negative peaks (e.g., peak 516). In some embodiments, the characterization application 112 determines a peak-based alignment score between the audience valence and the character valence by (1) identifying peaks associated with each of the time series 502 and 506, (2) generate piecewise linear functions corresponding to the time series 502 and 506 based on the associated peaks, (3) determining regions of alignment and misalignment between the piecewise linear functions based on slopes of the piecewise linear functions between peaks, and (4) computing the peak-based alignment score based on the regions of alignment and misalignment. The graphs 500 and 520 in FIGS. 5A-5B show exemplar piecewise linear functions 504 and 508 that are generated by connecting peaks of the time series 502 and 506, respectively, with linear functions. The piecewise linear functions 504 and 508 are rough approximations of the time series 502 and 506, respectively, with knots at local extrema values.

A time series can be characterized by significant positive and negative peaks (e.g., peaks 510 and 514 of the time series 502, or peaks 512 and 516 of the time series 506) that are essentially landmarks in the time series. In the case of time series corresponding to emotions, human memories of a sequence of emotional events can be highly influenced by high and low points in the emotions. In some embodiments, a peak-based alignment score measures the coordination or alignment between two time series representing audience valence and character valence (e.g., time series 502 and 506) based on how peaks of those time series are organized. Let the set $T(X)=\{t_0, t_1, \ldots, t_n\}$ define the indices of positive and negative peaks in a time series X(t). In some embodiments, the characterization application 112 computes a peak-based alignment score between time series X and Y as:

$$S_{pk}(X, Y) = \frac{1}{n}\sum_{i=1}^{n} 1[s_i = 1], \quad (3)$$

where 1[·] is the indicator function and $$s_i = \text{sgn}[X(t_{i+1})-X(t_i))(Y(t_{i+1})-Y(t_i))]$$

$$= \text{sgn}(\Delta X_i \Delta Y_i) \in \{-1, 0, 1\}. \quad (4)$$

In equation (4), sgn is the sign function. Intuitively, each $s_i$ in equation (4) compares the slope of the time series X(t) between turning points with the slope of the time series Y(t) during the same time period. If the slopes are of the same sign, then the time series are coordinated during the time period. If the slopes are of different signs, then the series are anti-coordinated during the time period. It should be noted that equation (3) is not symmetric (i.e., X and Y cannot be switched in equation (3)), but equation (3) can be made symmetric by calculating $\overline{S}_{pk}(X, Y)=\frac{1}{2}[S_{pk}(X, Y)++S_{pk}(Y, X)]$, where $S_{pk}(X, Y)$ is calculated over T(X) and $S_{pk}(Y, X)$ is calculated over T(Y). In some cases, the peak-based alignment score computed according to equation (3) (and the symmetric form thereof) can be more accurate than the negative logarithm of a Granger causality score, described above in conjunction with FIGS. 4A-4B, which is most sensitive to coordination between time series and less sensitive to misalignments.

Figure 6:
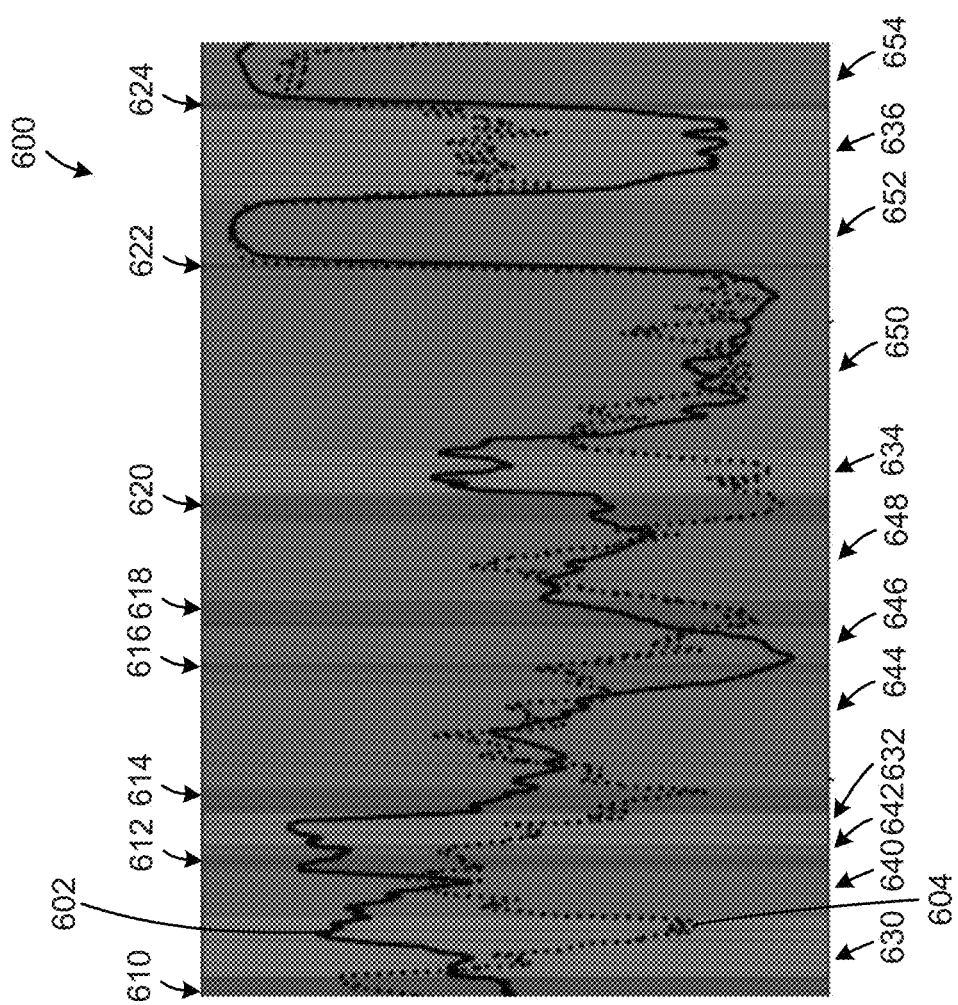
FIG. 6 illustrates exemplar states of alignment, misalignment; and neutrality between an audience valence signal and a character valence signal, according to various embodiments.

FIG. 6 illustrates exemplar states of alignment, misalignment, and neutrality between an audience valence signal and a character valence signal, according to various embodiments. As shown, a graph 600 includes a horizontal axis that represents time in seconds and a vertical axis that represents valence. The graph 600 also includes a time series 602 that represents the average valence of audience members consuming an episode of an episodic show and a time series 604 that represents the valence of characters in the episode. The time series 602 and 604 can be in aligned, misaligned, or neutral states relative to each other. As described, in aligned states, audience and character valence values are positively correlated and tend to move together. In misaligned states, audience and character valence values also move together but are negatively correlated. In neutral states, audience and character valence values are not correlated and do not move together. Illustratively, the time series 602 and 604 are in aligned states in regions 640, 642, 644, 646, 648, 650, 652, and 654 of the graph 600; the time series 602 and 604 are in misaligned states in regions 630, 632, 634, and 636 of the graph 600; and the time series 602 and 604 are in neutral states in regions 610, 612, 614, 616, 618, 620, 622, and 624 of the graph 600.

Figure 7A:
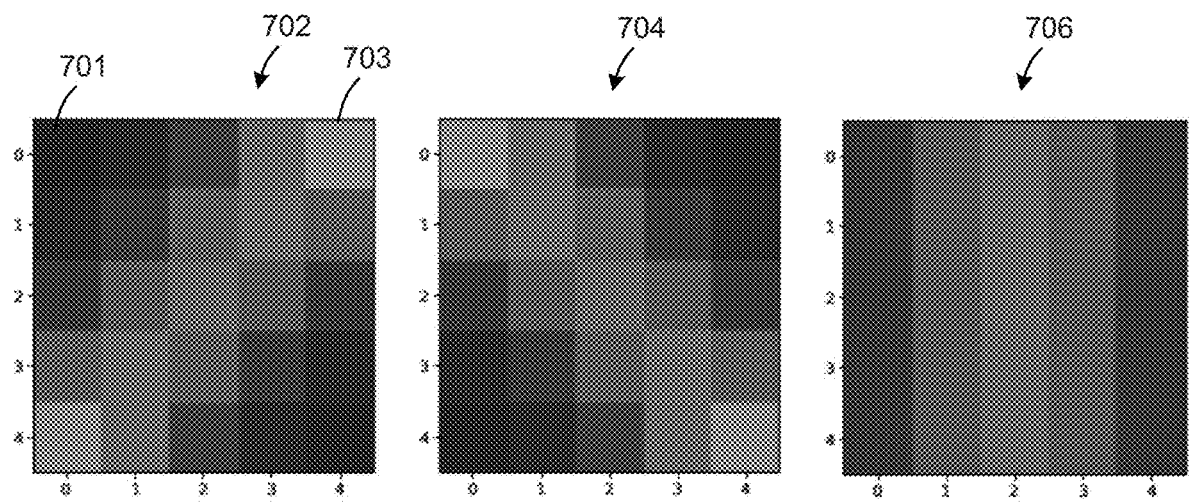
FIG. 7A illustrates exemplar initial conditional probability tensors associated with the misaligned, aligned, and neutral states between an audience valence signal and a character valence signal, according to various embodiments.
Figure 7B:
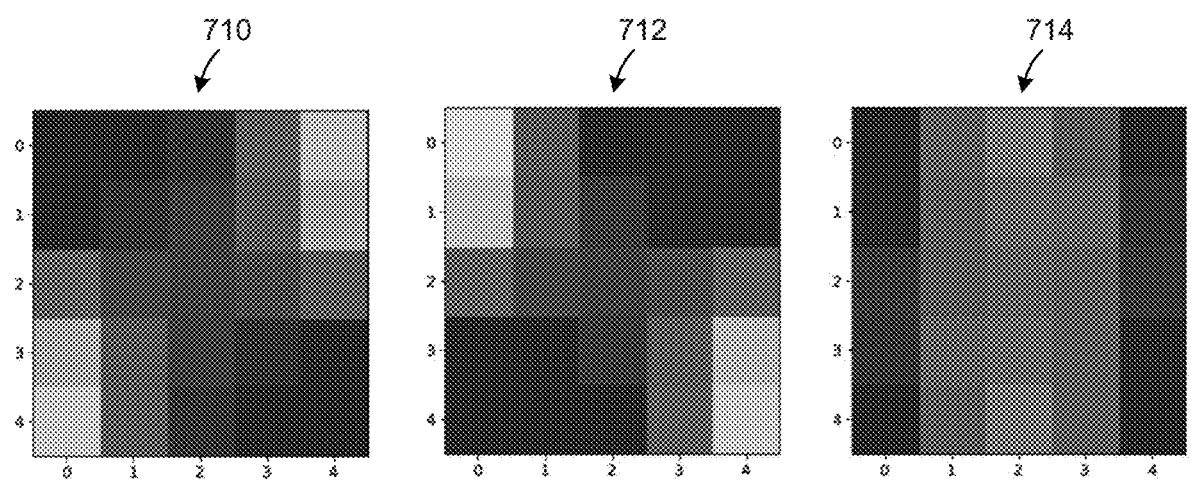
FIG. 7B illustrates exemplar learned conditional probability tensors associated with the misaligned, aligned, and neutral states between an audience valence signal and a character valence signal; according to various embodiments.

In some embodiments, the characterization application 112 determines a score that indicates the emotional alignment between one or more audience members who have watched a media content item and one or more characters in the media content item based on a latent state model that accounts for aligned, misaligned, and neutral states between time series (e.g., time series 602 and 604) representing audience valence and character valence. Such a latent state model score can also be more accurate than the negative logarithm of a Granger causality score, described above in conjunction with FIGS. 4A-4B, which is most sensitive to coordination between time series and less sensitive to misalignments, As a general matter, an audience valence and a character valence can change between aligned, misaligned, and neutral states. In some embodiments, the latent state model accounts for such changes in alignment using latent states, denoted herein by the variable s, that correspond to times of alignment, misalignment, and neutrality. More formally, in some embodiments, the latent state model includes a model of the emission probability Pr[y(t+1)|x(t)], where x(t) is the valence signal of a character (or multiple characters) on screen at a time t and y(t+1) is the valence signal of an audience member (or multiple audience members) that is observed at a next time step t+1. In some embodiments, the emission probability can be computed using conditional probability tensors that are initialized at the beginning of training and updated during the training based on the audience valence signal and the character valence signal. In some other embodiments, the conditional probability tensors may be fixed, rather than updated during training. FIGS. 7A-7B illustrate exemplar conditional probability tensors associated with the misaligned, aligned, and neutral states between an audience valence signal and a character valence signal, according to various embodiments. FIG. 7A shows exemplar initial conditional probability tensors 702, 704, and 706 for the misaligned, aligned, and neutral states, respectively. In the initial conditional probability tensors 702, 704, and 706, ranges of audience and character valence values are binned together in buckets, In the misaligned initial conditional probability tensor 702, a first bucket represents the lowest 20 percent (i.e., [0, 20)) of the audience and character valence values, a next buck represents the next lowest 20 percent (i.e., [20, 40)), and so on up to the top 20 percent (i.e., [80, 100)). For example, a bucket 701 could indicate the (low) conditional probability of observing the audience valence in the bottom 20% of the audience valence values given that the character valence is in the bottom 20% or the character valence values, while a bucket 703 could indicate the (high) conditional probability of observing the audience valence in the top 20% of the audience valence value given that the character valence is in the bottom 20% of character valence values. The high probability of a mismatch represented by the bucket 703 versus the low probability of a match represented by the bucket 701 is characteristic of the misalignment state. In some embodiments, initial conditional probability tensors (e.g., initial conditional probability tensors 702, 704, and 706) can be defined manually based on assumptions about values in the initial conditional probability tensors. FIG. 7B shows exemplar conditional probability tensors 710, 712, and 714 that are learned through training, described in greater detail below. Rows in the conditional probability tensors 702, 704, 706, 710, 712, and 714 represent character valence, and columns represent audience valence. In the conditional probability tensors 702 and 710 for the misaligned state, low character valence (organized along the rows) leads to high audience valence, and vice versa. In the conditional probability tensors 704 and 712 for the aligned state, character and audience valence values closely match. In the conditional probability tensors 706 and 714 for the neutral state, character valence has no influence on audience valence.

Prior to training, the characterization application 112 uses initial conditional probability tensors for the aligned, misaligned, and neutral states, such as the initial conditional probability tensors 702, 704, and 706, to initialize the training. During training, for time series of length T, the latent state model can be trained to assign states such that the likelihood $$L = \Pr[s_0] \, \Pi_{t=0}^{T-1} \, \Pr[y_{t+1}|x_t, s_{t+1}] \, \Pr[s_{t+1}|s_t] \quad (5)$$

is maximized, where for K (hidden) states and $N_x$ and $N_y$ possible observations of x and y, respectively, the emission probability $\Pr[y_{t+1}|x_t, s_{t+1}]$ is a $K \times N_x \times N_y$ conditional probability tensor of emissions, $\Pr[s_{t+1}|s_t]$ is a $K \times K$ state transition matrix, and $\Pr[s_0]$ the probability of an initial state of the audience consuming the media content item. In the conditional probability tensors 702, 704, 706, 710, 712. and 714 shown in FIGS. 7A-7B, K=3 and $N_x = N_y = 5$.

The state transition model of equation (5) assigns a value to every time step that is the probability of observing the audience valence signal y at time t+1 conditioned on the character valence signal at time t and the current state of the audience valence relative to the character valence (aligned or misaligned), times a probability associated with the transition between states that can introduce a stickiness that resists changes in state in some cases and a repelling effect in others. As used herein, "stickiness" refers to a high self-return probability, i.e., a high probability of staying in the same state once the state is entered, as opposed to transitioning to another state relatively quickly. Although described herein primarily with respect to an audience valence signal at a later time than a character valence signal, which is intended to model a causal relationship in which the audience valence signal responds to the character valence signal, in some embodiments the audience valence signal and the character valence signal can be at the same time in each time step. The state transition model of equation (5) resembles a hidden Markov model (HMM), with the key difference being that a typical HMM operates on only a single time series y(t) and optimizes a likelihood that depends on $\Pr[y_{t+1}|y_t, s_t]$. In some embodiments, the characterization application 112 applies an expectation-maximization (EM) algorithm, such as a variant of the Baum-Welch EM version of the EM algorithm to train the state transition model. In such cases, the characterization application 112 begins with an initial guess and fits the audience and character valence signals to the latent state model by computing a likelihood at multiple time steps, with the likelihood increasing at each time step. In addition, the characterization application 112 updates the state assumptions represented by the conditional probability tensors 702, 704, and 706 at each time step. By the principle of maximum likelihood, the observed audience and character valence signals should have the maximum likelihood, and the parameters of the state transition model are estimated through training to maximize such a likelihood. FIG. 7B shows exemplar conditional probability tensors 710, 712, and 714 that are learned through training. Unlike the standard training of HMMs, in some embodiments the emission probabilities $\Pr[y_{t+1}|x_t, s_{t+1}]$ can optionally be fixed, which guarantees interpretability of the assigned states, especially when multiple series are being analyzed.

Figure 8:
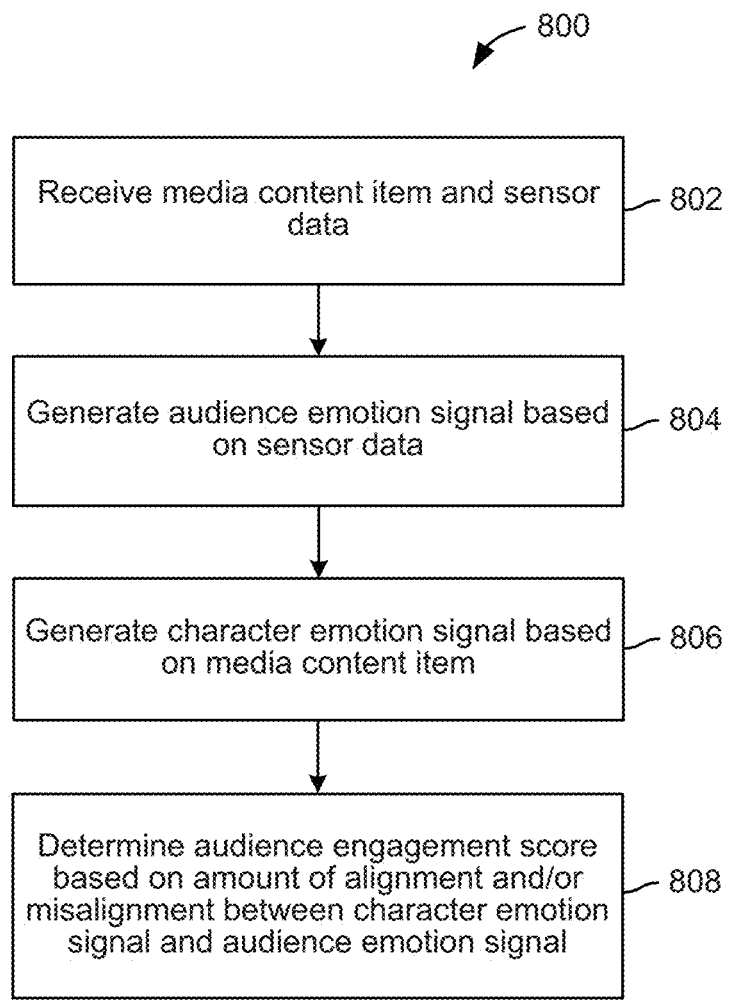
FIG. 8 sets forth a flow diagram of method steps for characterizing audience engagement with one or more characters in a media content item, according to various embodiments.

FIG. 8 sets forth a flow diagram of method steps for characterizing audience engagement with one or more characters in a media content item, according to various embodiments. Although the method steps are described in conjunction with the system of FIGS. 1-3, persons of ordinary skill in the art will understand that any system configured to perform the method steps, in any order, is within the scope of the present disclosure.

As shown, a method 800 begins at step 802, where the characterization application 112 receives a media content item and sensor data. In some embodiments, the media content item can be a video, such as a movie, an episode of an episodic show, a short film, an advertisement, a clip, a streaming video, a recording of a live event (including a transient recording), or a portion thereof. In some other embodiments, any technically feasible type of media content item can be received, such as a book, audio recording, or song. In some embodiments, the sensor data can include video data (including a transient recording) that captures the faces of one or more audience members consuming the media content item or the live event.

At step 804, the characterization application 112 generates an audience emotion signal based on the sensor data. In some embodiments, any suitable audience emotion signal, such as an audience valence signal, can be generated in any technically-feasible manner based on the sensor data. In some embodiments, the characterization application 112 processes the sensor data using a machine learning model, such as a deep learning model that takes frames of one or more videos that include faces of one or more audience members as inputs and outputs corresponding valence values, to generate the audience emotion signal. In some embodiments, the audience emotion signal can be generated for an individual audience member, or as an average over multiple audience members, as described above in conjunction with FIG. 3.

At step 806, the characterization application 112 generates a character emotion signal based on the media content item. Although shown as being performed after step 804 for illustrative purposes, in some embodiments, step 806 can be performed before, or in parallel with step 804. In some embodiments, any suitable character emotion signal, such as a character valence signal, can be generated in any technically-feasible manner based on the media content item. In some embodiments, the characterization application 112 processes the media content item using a machine learning model to generate the character emotion signal. The same or a different machine learning that is used to generate the audience emotion signal can be applied to generate the character emotion signal, as described above in conjunction with FIG. 3. For example, in some embodiments, the character emotion signal can be generated by inputting frames of a media content item into a machine learning model that outputs valence values for one or more characters in those frames. As another example, in some embodiments, the character emotion signal can be generated by inputting words spoken by one or more characters in a media content item into a natural language processing model that outputs valence values at different times.

At step 808, the characterization application 112 determines an audience engagement score based on an amount of alignment and/or misalignment between the character emotion signal and the audience emotion signal. In some embodiments, any suitable audience engagement score can be computed, in any technically-feasible manner, based on the character emotion signal and the audience emotion signal. In some embodiments, when distinct audience emotion signals are generated for individual audience members, an audience engagement score can be computed for each audience member, and the audience engagement scores can be averaged together to generate an overall audience engagement score for multiple audience members. In some other embodiments, audience emotion signals for different audience members can be averaged first to generate an average audience emotion signal, and an alignment can be computed between the average audience emotion signal and the character emotion signal. In some embodiments, the audience engagement score can be computed at step 808 as the negative logarithm of a Granger causality score, as a peak-based alignment score, or based on a latent state model of alignment. In some embodiments, the audience engagement score can be computed based on any technically feasible measure of correlation, mutual information, and/or latent-state modeling between the audience emotion signal and the character emotion signal. Method steps for computing the negative logarithm of a Granger causality score are described in greater detail below in conjunction with FIG. 9. Method steps for computing a peak-based alignment score are described in greater detail below in conjunction with FIG. 10. Method steps for computing an audience engagement score based on a latent state model of alignment are described in greater detail below in conjunction with FIG. 11.

Figure 9:
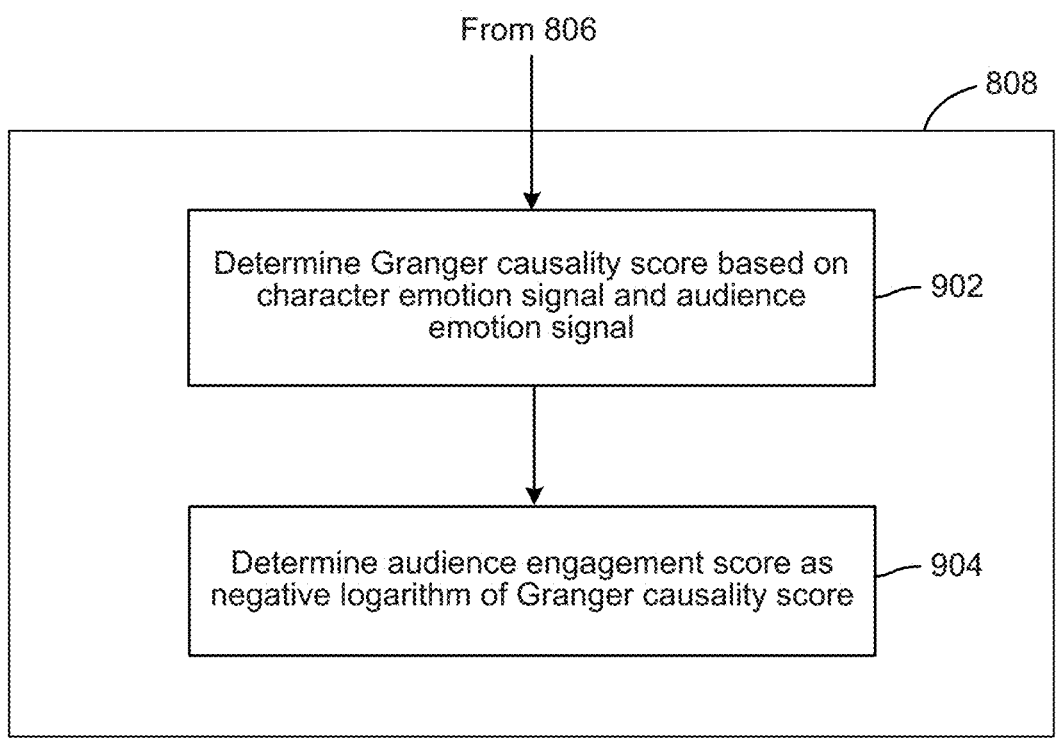
FIG. 9 sets forth a flow diagram of method steps for determining an audience engagement score, according to various embodiments.
Figure 10:
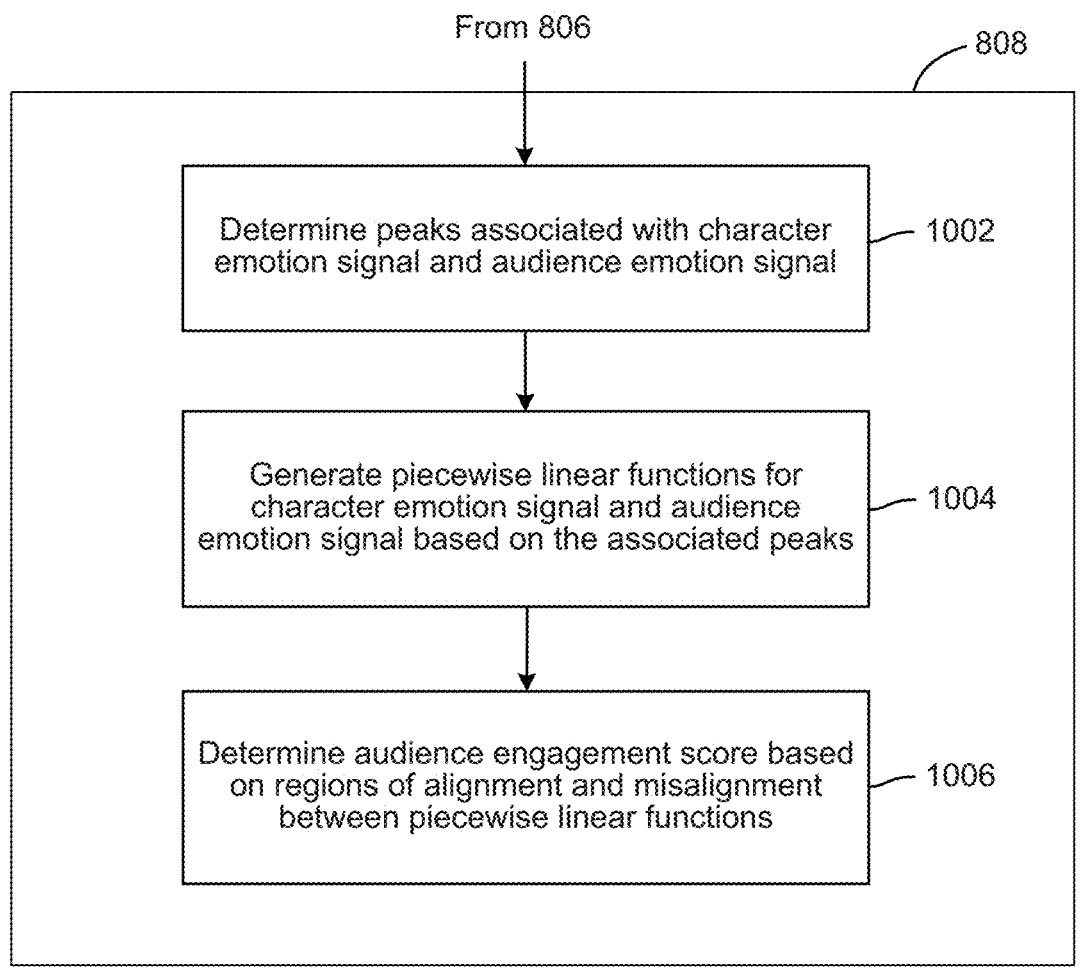
FIG. 10 sets forth a flow diagram of method steps for determining an audience engagement score, according to various other embodiments.

FIG. 9 sets forth a flow diagram of method steps for determining the audience engagement score at step 808 of FIG. 8, according to various embodiments. Although the method steps are described in conjunction with the system of FIGS. 1-3, persons of ordinary skill in the art will understand that any system configured to perform the method steps, in any order, is within the scope of the present disclosure.

As shown, at step 902, the characterization application 112 determines a Granger causality score based on the character emotion signal and the audience emotion signal. In some embodiments, the Granger causality score can be computed by pooling the p-values of one or more statistical tests of Granger causality after selecting an optimized lag between the character emotion signal and the audience emotion signal via the AIC, as described above in conjunction with FIGS. 4A-B, At step 904, the characterization application 112 determines the audience engagement score as a negative logarithm of the Granger causality score. In some embodiments, the audience engagement score can be computed according to equation (2), described above in conjunction with FIGS. 4A-4B, As described, the negative logarithm in equation (2) makes the audience engagement score a measure of the "surprisal" of observing a given alignment between an audience emotion signal and a character emotion signal absent a Granger-causal link, FIG. 10 sets forth a flow diagram of method steps for determining the audience engagement score at step 808 of FIG. 8, according to other various embodiments. Although the method steps are described in conjunction with the system of FIGS. 1-3, persons of ordinary skill in the art will understand that any system configured to perform the method steps, in any order, is within the scope of the present disclosure.

As shown, at step 1002, the characterization application 112 determines peaks associated with the character emotion signal and with the audience emotion signal. In some embodiments, the peaks can include positive and negative peaks corresponding to local maxima and minimum, respectively, in values of the character emotion signal and the audience emotion signal. Such peaks occur where the first derivative of the character emotion signal and the audience emotion signal change sign.

At step 1004, the characterization application 112 generates piecewise linear functions for the character emotion signal and the audience emotion signal based on the associated peaks. In some embodiments, the piecewise linear functions can be generated by connecting peaks of the time series for the character and audience emotion signals with linear functions.

At step 1006, the characterization application 112 determines an audience engagement score based on regions of alignment and misalignment between the piecewise Hear functions. In some embodiments, the audience engagement score can be computed by adding together indicators of whether the piecewise linear functions are aligned or misaligned during each time period according to equation (3) or the symmetric form thereof, described above in conjunction with FIGS. 5A-5B. In such cases, the characterization application 112 can determine whether the piecewise linear functions are aligned or misaligned based on slopes of the piecewise linear function between the associated peaks. In regions of alignment, the slopes of the piecewise linear functions have the same sign. In regions of misalignment, the slopes of the piecewise linear functions have different signs.

Figure 11:
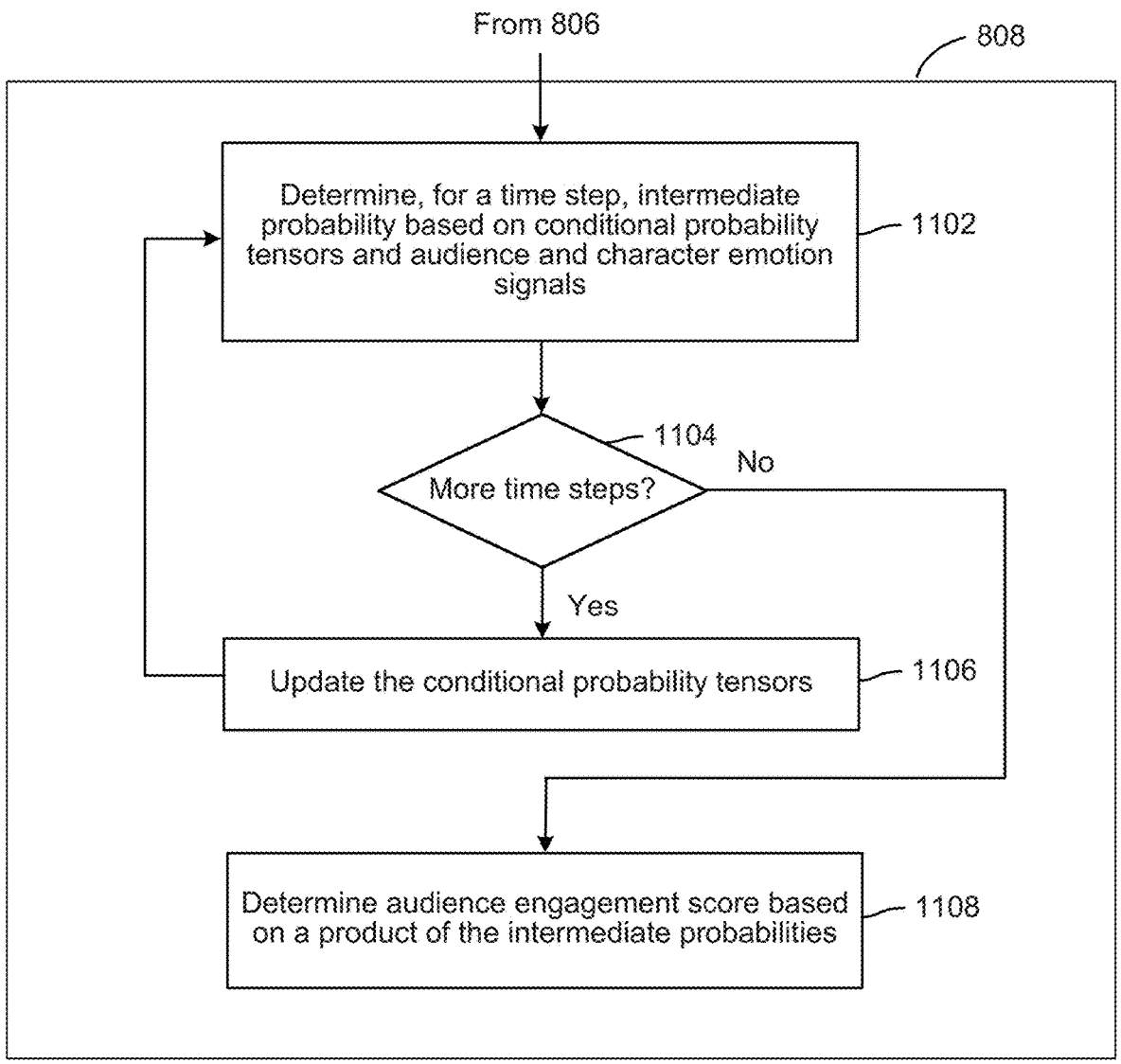
FIG. 11 sets forth a flow diagram of method steps for determining an audience engagement score, according to various other embodiments.

FIG. 11 sets forth a flow diagram of method steps for determining the audience engagement score at step 808 of FIG. 8, according to other various embodiments. Although the method steps are described in conjunction with the system of FIGS. 1-3, persons of ordinary skill in the art will understand that any system configured to perform the method steps, in any order, is within the scope of the present disclosure.

As shown, at step 1102, the characterization application 112 determines, for a time step, an intermediate probability based on conditional probability tensors, the character emotion signal, and the audience emotion signal. In some embodiments, the intermediate probability is the product of the emission probability and the state transition probability $\Pr[y_{t+1}|x_t, s_{t+1}] \Pr[s_{t+1}|s_t]$ in equation (5), described above in conjunction with FIGS. 7A-7B. In such cases, the conditional probability tensors can include tensors associated with aligned, misaligned, and neutral states between the character emotion signal and the audience emotion signal that are initialized prior to training and updated during training.

At step 1104, if there are more points in time to consider, then at step 1106, the characterization application 112 updates the conditional probability tensors. In some embodiments, the conditional probability tensors can be updated according to an EM algorithm, such as a variant of the Baum-Welch EM version of the EM algorithm, described above in conjunction with FIGS. 7A-B. Then, returning to step 1102, the characterization application 112 determines an intermediate probability for a next point in time using the updated conditional probability tensors.

On the other hand, if there are no more points in time, then at step 1108, the characterization application 112 determines the audience engagement score based on a product of the intermediate probabilities. In some embodiments, the audience engagement score can be computed according to equation (5), described above in conjunction with FIGS. 7A-7B.

In sum, techniques are disclosed for characterizing audience engagement with one or more characters in a media content item. In some embodiments, a characterization application processes sensor data, such as video data capturing the faces of one or more audience members consuming a media content item, to generate an audience emotion signal. The characterization application also processes the media content item to generate a character emotion signal associated with one or more characters in the media content item. Then, the characterization application determines an audience engagement score based on an amount of alignment and/or misalignment between the audience emotion signal and the character emotion signal. In some embodiments, the audience engagement score can be computed as the negative logarithm of a Granger causality score, based on peaks in the audience emotion signal and the character emotion signal, or based on a latent state model of alignment between the audience emotion signal and the character emotion signal, among other things.

At least one technical advantage of the disclosed techniques relative to the prior art is that the disclosed techniques generate an audience engagement score based on involuntary emotional reactions of audience members to characters in a media content item, which is not susceptible to self-reporting bias and, therefore, more reliable than conventional survey and dial testing data. Accordingly, the disclosed techniques can be used to systematically predict audience engagement with a media content item. The predicted audience engagement can then be used to decide whether to produce the media content item or a collection thereof, to schedule a time for airing the media content item, to identify particular characters within the media content item that audiences engage with, and/or to modify the media content item, among other things. These technical advantages represent one or more technological improvements over prior art approaches.

Any and all combinations of any of the claim elements recited in any of the claims and/or any elements described in this application, in any fashion, fall within the contemplated scope of the present invention and protection.

1. In some embodiments, a computer-implemented method for characterizing engagement with at least one character in a media content item comprises processing sensor data associated with at least one individual to generate a first signal that indicates one or more emotions expressed by the at least one individual while consuming the media content item or a live event recorded in the media content item, processing the media content item to generate a second signal that indicates one or more emotions expressed by the at least one character in the media content item, and computing a score based on the first signal and the second signal, wherein the score indicates at least one of an amount of alignment or an amount of misalignment between the first signal and the second signal.

2. The computer-implemented method of clause 1, wherein the score indicates mutual information between the first signal and the second signal.

3. The computer-implemented method of clauses 1 or , wherein computing the score comprises computing another score via one or more operations that test for Granger causality based on the first signal and the second signal, and computing a negative logarithm of the another score.

4. The computer-implemented method of any of clauses 1-3, wherein computing the score comprises determining one or more peaks associated with the first signal, generating a first piecewise linear function based on the one or more peaks, determining one or more additional peaks associated with the second signal, generating a second piecewise linear function based on the one or more additional peaks, and computing the score based on slopes of the first piecewise linear function and corresponding slopes of the second piecewise linear function.

5. The computer-implemented method of any of clauses 1-4, wherein computing the score comprises computing one or more intermediate probabilities based on a plurality of conditional probabilities, the first signal, and the second signal, wherein the plurality of conditional probabilities are associated with aligned, misaligned, and neutral states between the first signal and the second signal, and wherein the plurality of conditional probabilities are updated based on the first signal and the second signal during the computing of the one or more intermediate probabilities, and computing the score based on the one or more intermediate probabilities.

6. The computer-implemented method of any of clauses 1-5, wherein the first signal indicates a valence associated with the at least one individual over at least one period of time, and the second signal indicates a valence associated with the at least one character over the at least one period of time.

7. The computer-implemented method of any of clauses 1-6, wherein the sensor data and the media content item are processed via one or more machine learning models to generate the first signal and the second signal, respectively.

8. The computer-implemented method of any of clauses 1-7, wherein the at least one character includes either any character whose face is largest in one or more frames of the media content item, or one or more pre-selected characters that are detected in one or more frames of the media content item.

9. The computer-implemented method of any of clauses 1-8, wherein the media content item comprises one of a movie, an episode of an episodic show, a short film, an advertisement, a recording of an event, a clip, a streaming video, a book, an audio recording, a song, or a portion thereof.

10. In some embodiments, one or more non-transitory computer-readable storage media include instructions that, when executed by at least one processor, cause the at least one processor to perform steps for characterizing engagement with at least one character in a media content item, the steps comprising processing sensor data associated with at least one individual to generate a first signal that indicates one or more emotions expressed by the at least one individual while consuming the media content item or a live event recorded in the media content item, processing the media content item to generate a second signal that indicates one or more emotions expressed by the at least one character in the media content item, and computing a score based on the first signal and the second signal, wherein the score indicates at least one of an amount of alignment or an amount of misalignment between the first signal and the second signal.

11. The one or more non-transitory computer-readable storage media of clause 10, wherein computing the score comprises computing another score via one or more operations that test for Granger causality based on the first signal and the second signal, and computing a negative logarithm of the another score.

12. The one or more non-transitory computer-readable storage media of clauses 10 or 11, wherein computing the score comprises determining one or more peaks associated with the first signal, generating a first piecewise linear function based on the one or more peaks, determining one or more additional peaks associated with the second signal, generating a second piecewise linear function based on the one or more additional peaks, and computing the score based on slopes of the first piecewise linear function and corresponding slopes of the second piecewise linear function.

13. The one or more non-transitory computer-readable storage media of any of clauses 10-12, wherein computing the score comprises computing one or more intermediate probabilities based on a plurality of conditional probabilities, the first signal, and the second signal, wherein the plurality of conditional probabilities are associated with aligned, misaligned, and neutral states between the first signal and the second signal, and wherein the plurality of conditional probabilities are updated based on the first signal and the second signal during the computing of the one or more intermediate probabilities, and computing the score based on the one or more intermediate probabilities.

14. The one or more non-transitory computer-readable storage media of any of clauses 10-13, wherein the first signal indicates a valence associated with the at least one individual over at least one period of time, and the second signal indicates a valence associated with the at least one character over the at least one period of time.

15. The one or more non-transitory computer-readable storage media of any of clauses 10-14, wherein the sensor data is processed via a first machine learning model to generate the first signal, and the media content item is processed via a second machine learning model to generate the second signal.

16. The one or more non-transitory computer-readable storage media of any of clauses 10-15, wherein the first machine learning model is a facial emotion recognition model, and the second machine learning model is the same as the first machine learning model.

17. The one or more non-transitory computer-readable storage media of any of clauses 10-16, wherein the second machine learning model is a natural language processing model 18. The one or more non-transitory computer-readable storage media of any of clauses 10-17, wherein the at least one character includes either any character whose face is largest in one or more frames of the media content item, or one or more pre-selected characters that are detected in one or more frames of the media content item.

19. In some embodiments, a system comprises one or more sensors that acquire sensor data associated with at least one individual as the at least one individual consumes a media content item or a live event recorded in the media content item, one or more memories storing instructions, and one or more processors that are coupled to the one or more memories and, when executing the instructions, are configured to process the sensor data to generate a first signal that indicates one or more emotions expressed by the at least one individual, process the media content item to generate a second signal that indicates one or more emotions expressed by at least one character in the media content item, and compute a score based on the first signal and the second signal, wherein the score indicates at least one of an amount of alignment or an amount of misalignment between the first signal and the second signal.

20. The system of clause 19, wherein the score is computed based on at least one of an alignment or a misalignment of the first signal with the second signal during one or more periods of time.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for characterizing engagement with at least one character in a media content item, the method comprising:
    processing sensor data associated with at least one individual to generate a first signal that indicates one or more emotions expressed by the at least one individual while consuming the media content item or a live event recorded in the media content item;
    processing the media content item to generate a second signal that indicates one or more emotions expressed by the at least one character in the media content item; and
    computing a score based on the first signal and the second signal, wherein the score is indicative of at least one of an amount of alignment or an amount of misalignment between the first signal and the second signal, and the computing comprises determining at least one of: 1) whether values of the second signal are predictive of values of the first signal, or 2) whether values of the first signal are predictive of values of the second signal.

2. The computer-implemented method of claim 1, wherein the score indicates mutual information between the first signal and the second signal.

3. The computer-implemented method of claim 1, wherein determining at least one of: 1) whether values of the second signal are predictive of values of the first signal, or 2) whether values of the first signal are predictive of values of the second signal comprises:
    computing another score via one or more operations that test for Granger causality based on the first signal and the second signal; and
    computing a negative logarithm of the another score.

4. The computer-implemented method of claim 1, wherein computing the score comprises:
    determining one or more peaks associated with the first signal;
    generating a first piecewise linear function based on the one or more peaks;
    determining one or more additional peaks associated with the second signal;
    generating a second piecewise linear function based on the one or more additional peaks; and
    computing the score based on slopes of the first piecewise linear function and corresponding slopes of the second piecewise linear function.

5. The computer-implemented method of claim 1, wherein computing the score comprises:
    computing one or more intermediate probabilities based on a plurality of conditional probabilities, the first signal, and the second signal, wherein the plurality of conditional probabilities are associated with aligned, misaligned, and neutral states between the first signal and the second signal, and wherein the plurality of conditional probabilities are updated based on the first signal and the second signal during the computing of the one or more intermediate probabilities; and
    computing the score based on the one or more intermediate probabilities.

6. The computer-implemented method of claim 1, wherein the first signal indicates a valence associated with the at least one individual over at least one period of time, and the second signal indicates a valence associated with the at least one character over the at least one period of time.

7. The computer-implemented method of claim 1, wherein the sensor data and the media content item are processed via one or more machine learning models to generate the first signal and the second signal, respectively.

8. The computer-implemented method of claim 1, wherein the at least one character includes either:
    any character whose face is largest in one or more frames of the media content item; or
    one or more pre-selected characters that are detected in one or more frames of the media content item.

9. The computer-implemented method of claim 1, wherein the media content item comprises one of a movie, an episode of an episodic show, a short film, an advertisement, a recording of an event, a clip, a streaming video, a book, an audio recording, a song, or a portion thereof.

10. One or more non-transitory computer-readable storage media including instructions that, when executed by at least one processor, cause the at least one processor to perform steps for characterizing engagement with at least one character in a media content item, the steps comprising:
    processing sensor data associated with at least one individual to generate a first signal that indicates one or more emotions expressed by the at least one individual while consuming the media content item or a live event recorded in the media content item;

processing the media content item to generate a second signal that indicates one or more emotions expressed by the at least one character in the media content item; and computing a score based on the first signal and the second signal, wherein the score is indicative of at least one of an amount of alignment or an amount of misalignment between the first signal and the second signal, and the computing comprises determining at least one of: 1) whether values of the second signal are predictive of values of the first signal, or 2) whether values of the first signal are predictive of values of the second signal.

11. The one or more non-transitory computer-readable storage media of claim 10, wherein determining at least one of: 1) whether values of the second signal are predictive of values of the first signal, or 2) whether values of the first signal are predictive of values of the second signal comprises:

computing another score via one or more operations that test for Granger causality based on the first signal and the second signal; and computing a negative logarithm of the another score.

12. The one or more non-transitory computer-readable storage media of claim 10, wherein computing the score comprises:

determining one or more peaks associated with the first signal;

generating a first piecewise linear function based on the one or more peaks;

determining one or more additional peaks associated with the second signal;

generating a second piecewise linear function based on the one or more additional peaks; and computing the score based on slopes of the first piecewise linear function and corresponding slopes of the second piecewise linear function.

13. The one or more non-transitory computer-readable storage media of claim 10, wherein computing the score comprises:

computing one or more intermediate probabilities based on a plurality of conditional probabilities, the first signal, and the second signal, wherein the plurality of conditional probabilities are associated with aligned, misaligned, and neutral states between the first signal and the second signal, and wherein the plurality of conditional probabilities are updated based on the first signal and the second signal during the computing of the one or more intermediate probabilities; and computing the score based on the one or more intermediate probabilities.

14. The one or more non-transitory computer-readable storage media of claim 10, wherein the first signal indicates a valence associated with the at least one individual over at least one period of time, and the second signal indicates a valence associated with the at least one character over the at least one period of time.

15. The one or more non-transitory computer-readable storage media of claim 10, wherein the sensor data is processed via a first machine learning model to generate the first signal, and the media content item is processed via a second machine learning model to generate the second signal.

16. The one or more non-transitory computer-readable storage media of claim 15, wherein the first machine learning model is a facial emotion recognition model.

17. The one or more non-transitory computer-readable storage media of claim 15, wherein the second machine learning model is a natural language processing model.

18. The one or more non-transitory computer-readable storage media of claim 10, wherein the at least one character includes either:

any character whose face is largest in one or more frames of the media content item; or one or more pre-selected characters that are detected in one or more frames of the media content item.

19. A system, comprising:

one or more sensors that acquire sensor data associated with at least one individual as the at least one individual consumes a media content item or a live event recorded in the media content item;

one or more memories storing instructions; and one or more processors that are coupled to the one or more memories and, when executing the instructions, are configured to:

process the sensor data to generate a first signal that indicates one or more emotions expressed by the at least one individual, process the media content item to generate a second signal that indicates one or more emotions expressed by at least one character in the media content item, and compute a score based on the first signal and the second signal, wherein the score is indicative of at least one of an amount of alignment or an amount of misalignment between the first signal and the second signal, and the computing comprises determining at least one of: 1) whether values of the second signal are predictive of values of the first signal, or 2) whether values of the first signal are predictive of values of the second signal.

20. The system of claim 19, wherein if, during one or more periods of time, either values of the second signal are predictive of values of the first signal or values of the first signal are predictive of values of the second signal, based on the determining, then the score indicates increased alignment compared with periods of time where values of the second signal are not predictive of values of the first signal or values of the first signal are not predictive of values of the second signal.

* * * * *